US006950838B2

(12) United States Patent
Wright et al.

(10) Patent No.: US 6,950,838 B2
(45) Date of Patent: Sep. 27, 2005

(54) LOCATING REFERENCES AND ROOTS FOR IN-CACHE GARBAGE COLLECTION

(75) Inventors: Gregory M. Wright, Mountain View, CA (US); Mario I. Wolczko, San Carlos, CA (US); Matthew L. Seidl, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 590 days.

(21) Appl. No.: 10/124,122

(22) Filed: Apr. 17, 2002

(65) Prior Publication Data

US 2003/0200392 A1 Oct. 23, 2003

(51) Int. Cl.[7] ............................................. G06F 17/30
(52) U.S. Cl. ..................................... 707/206; 711/118
(58) Field of Search ............................. 707/206, 118; 711/118

(56) References Cited

U.S. PATENT DOCUMENTS

| | | | | | |
|---|---|---|---|---|---|
| 5,893,121 | A | * | 4/1999 | Ebrahim et al. ............. | 707/206 |
| 6,021,469 | A | * | 2/2000 | Tremblay et al. ............ | 711/125 |
| 6,038,643 | A | * | 3/2000 | Tremblay et al. ............ | 711/132 |
| 6,125,439 | A | * | 9/2000 | Tremblay et al. ............ | 712/202 |
| 6,199,075 | B1 | * | 3/2001 | Ungar et al. ................. | 707/206 |
| 6,453,319 | B1 | * | 9/2002 | Mattis et al. ................ | 707/100 |
| 6,671,707 | B1 | * | 12/2003 | Hudson et al. .............. | 707/206 |
| 2002/0199065 | A1 | * | 12/2002 | Subramoney et al. ....... | 711/137 |
| 2003/0093397 | A1 | * | 5/2003 | Yuasa ........................... | 707/1 |

OTHER PUBLICATIONS

M. Wolczko et al., "Multi–level Garbage Collection in a High–Performance Persistent Object System," Proceedings of the Fifth International Workshop on Persistent Object System, Pisa, Italy, Sep. 1–4, 1992; 23 pages.
I. Williams et al., "An Object–Based Memory Architecture," Implementing Persistent Object Bases: Proc. Fourth International Workshop on Persistent Object Systems, Morgan Kaufman, 1991, pp. 114–130, 22 pages.

* cited by examiner

*Primary Examiner*—Leslie Wong
(74) *Attorney, Agent, or Firm*—Osha·Liang LLP

(57) ABSTRACT

A computer system providing hardware states for garbage collection including a plurality of processors, an object cache operatively connected to at least one of the plurality of processors, and a warden operatively connected to the object cache, wherein the warden broadcasts a non-local command to the object cache whenever the tagged cache line is evicted and crosses the garbage collection boundary and the modified-reference bit in the tagged cache line is set.

25 Claims, 7 Drawing Sheets

US 6,950,838 B2

LOCATING REFERENCES AND ROOTS FOR IN-CACHE GARBAGE COLLECTION

BACKGROUND OF INVENTION

Garbage collection is the automatic management of dynamically allocated memory storage. Garbage collection typically involves an automatic periodic reclamation of dynamically allocated memory by a garbage collector, i.e., the process performing the garbage collection. Various events may trigger garbage collection, for example, garbage collection may be triggered during a memory allocation step where the amount of unallocated memory is less than some threshold value. In most implementations of garbage collection, the executing program is suspended while garbage collection takes place. Once the garbage collection has been completed, the executing program is allowed to resume.

To reclaim a dynamically allocated piece of memory, the garbage collector ensures that the piece of memory to be reclaimed is not live. The term "live" in the context of garbage collection refers to a piece of memory containing data that is required by an executing program, or is at least reachable by following a path of pointers from a root, i.e., a memory location that is always deemed as live. There are many algorithms that have been developed to solve this problem. One such algorithm is the Mark-Sweep Algorithm, see "John McCarthy, Recursive functions of symbolic expressions and their computation by machine, *Communications of the ACM*, 3:184–195, 1960." The Mark-Sweep algorithm is performed in two phases. The first phase is the marking phase. In the first phase, the algorithm performs a global traversal of a heap, i.e., an area of memory used for dynamic memory allocation where blocks of memory are allocated and freed in an arbitrary order and the pattern of allocation and size of blocks is not known until run time, to determine which parts of the heap are available for reclamation. In an exemplary computer system, the heap may be located in a portion of memory, with an L1 cache and an L2 cache. A number of methods have been developed to perform this traversal. One such method is a recursive traversal of the heap. In a recursive traversal of the heap, the algorithm starts at a root and proceeds to follow all pointers connected directly and indirectly to the roots, such that all pieces of memory connected directly or indirectly to the root are found. Every piece of memory encountered in the recursive traversal is marked as live. Upon completion of the mark phase, the second phase (denoted the sweep phase) is initiated. During the sweep phase, any piece of memory that is not marked as live is reclaimed.

FIG. 1 illustrates a heap after completion of the marking phase in accordance with the Mark-Sweep algorithm described above. The heap (2) contains seven dynamically allocated pieces of memory, each denoted as a cell. Cell (4) is referenced by a root reference (3) and is marked as live, as denoted by the associated shaded mark bit (18). As described above, during the marking phase the Mark-Sweep algorithm recursively traces all pointers from the root cell (4) and marks all cells encountered as live. In this particular example, cell (6), cell (8) and cell (12) are all marked as live, as denoted by the shaded reference bit on each of the aforementioned cells. Cell (10), cell (14), and cell (16) are not referenced, directly or indirectly, by the root cell (4) and, as such, are not marked as live. Once the marking phase is complete, all cells that are not marked as live are reclaimed, during the sweep phase. In this example, cell (10), cell (14), and cell (16) would be reclaimed during the sweep phase.

While the garbage collection algorithm illustrated above collects garbage over the entire heap, only collecting garbage in a subset of the heap is often desirable. For example, in-cache garbage collection only collects dynamically allocated objects within the cache. This approach increases the garbage collection efficiency as there is no garbage collection performed in memory external to the cache. In addition, as object-based systems become widespread, large object stores are becoming more common. To date, most solutions have been implemented using stock hardware, and supporting software. While acceptable as an initial solution, large performance gains may be possible using architectures more suited to the task at hand.

SUMMARY OF INVENTION

In general, in one aspect, the invention relates to a computer system providing hardware states for garbage collection comprising a plurality of processors, an object cache operatively connected to at least one of the plurality of processors, and a warden operatively connected to the object cache, wherein the warden broadcasts a non-local command to the object cache.

In general, in one aspect, the invention relates to a computer system providing hardware states for garbage collection comprising a plurality of processors, an object cache operatively connected to at least one of the plurality of processors, a warden operatively connected to the object cache, wherein the warden broadcasts a non-local command to the object cache, a memory, and a translator interposed between the warden and the memory, wherein the translator maps an object address to a physical address within the memory.

In general, in one aspect, the invention relates to a method for local garbage collection in a multiprocessor environment comprising halting all processors within a garbage collection boundary; scanning a cache line in an object cache for a first object, marking the first object as live if the first object is referenced by a root, scanning the first object for a reference to a second object if the first object is live, broadcasting a mark object command if the reference to the second object is found, marking the cache line as done, and reclaiming the first object if the first object is not live.

In general, in one aspect, the invention relates to an apparatus for performing local garbage collection in a multiprocessor environment comprising means for halting all processors within a garbage collection boundary, means for scanning a cache line in an object cache for a first object, means for marking the first object as live if the first object is referenced by a root, means for scanning the first object for a reference to a second object if the first object is live, means for broadcasting a mark object command if the reference to the second object is found, means for marking the cache line as done, and means for reclaiming the first object if the first object is not live.

Other aspects and advantages of the invention will be apparent from the following description and the appended claims.

DETAILED DESCRIPTION

Figure 1:
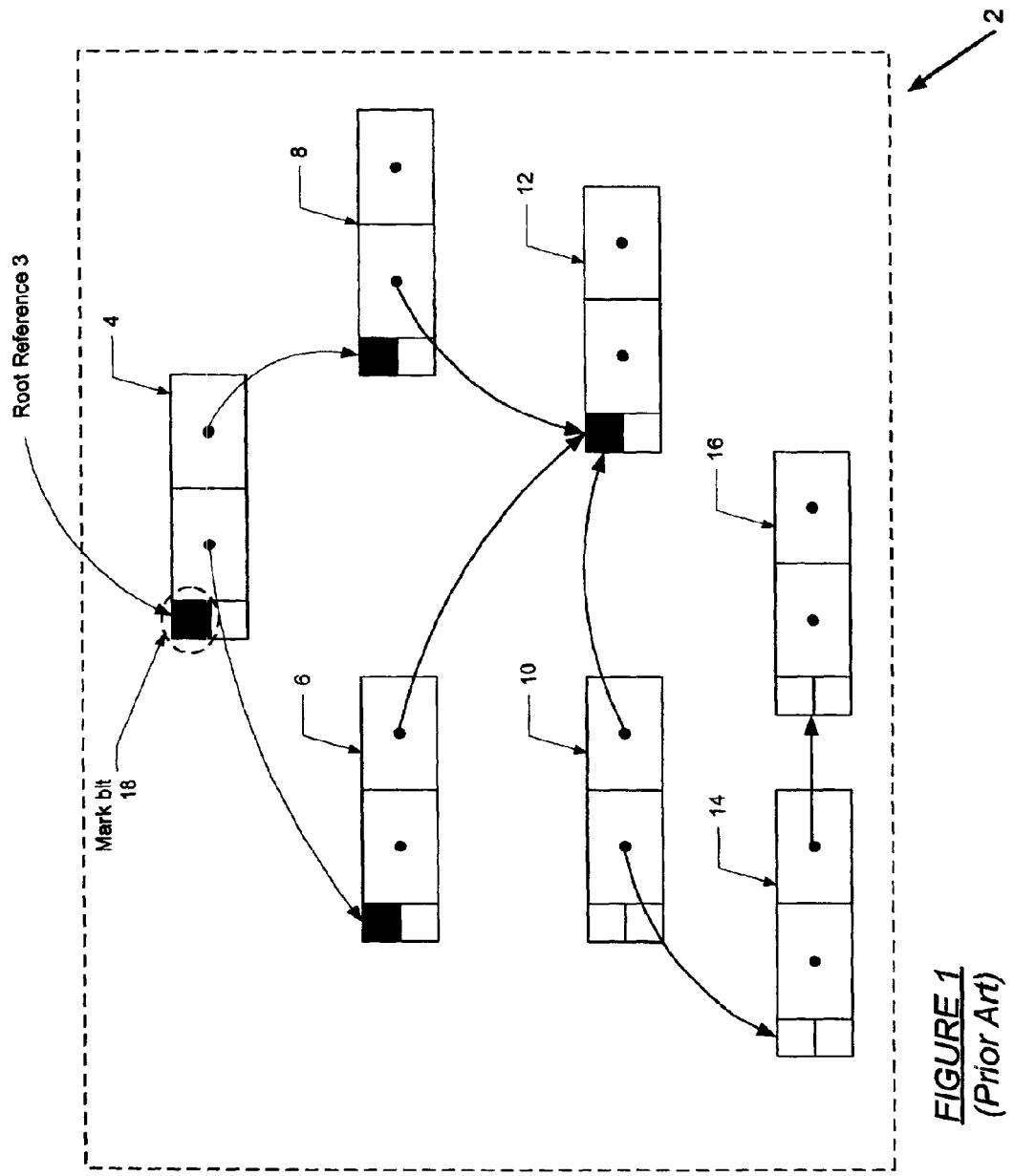
FIG. 1 illustrates a heap after completion of the marking phase in accordance with the Mark-Sweep algorithm.

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to an in-cache garbage collection system. Further, the invention relates to providing a hardware state and hardware assistance to facilitate in-cache garbage collection. Further, the invention relates to an in-cache garbage collection system that collects objects.

To build a garbage collector that collects objects and collects only a subset of a heap, three criteria should be met: (i) the garbage collection system is able to identify whether a datum within an object is a reference to another object, (ii) the garbage collection system is able to identify root references outside of an object, i.e., typically references held by a virtual machine or references currently on a process stack, (iii) the garbage collection system is able to identify references from objects that are not being collected to objects that are subject to collection.

Criterion (i) is typically satisfied in the hardware using a system-wide, tagged memory scheme, or in software with a data structure to track references within an object. Criterion (ii) is typically satisfied by identifying any reference held by the virtual machine or any reference on the process stack as a root reference. This is typically implemented using a software process to examine all references held by the virtual machine and all references on the process stack. Criterion (iii) is typically satisfied by implementing a "write-barrier" and an additional data structure in software. Typically, when a reference to an object crosses the "write barrier", the reference effectively acts as a root for subsequent garbage collection.

Figure 2:
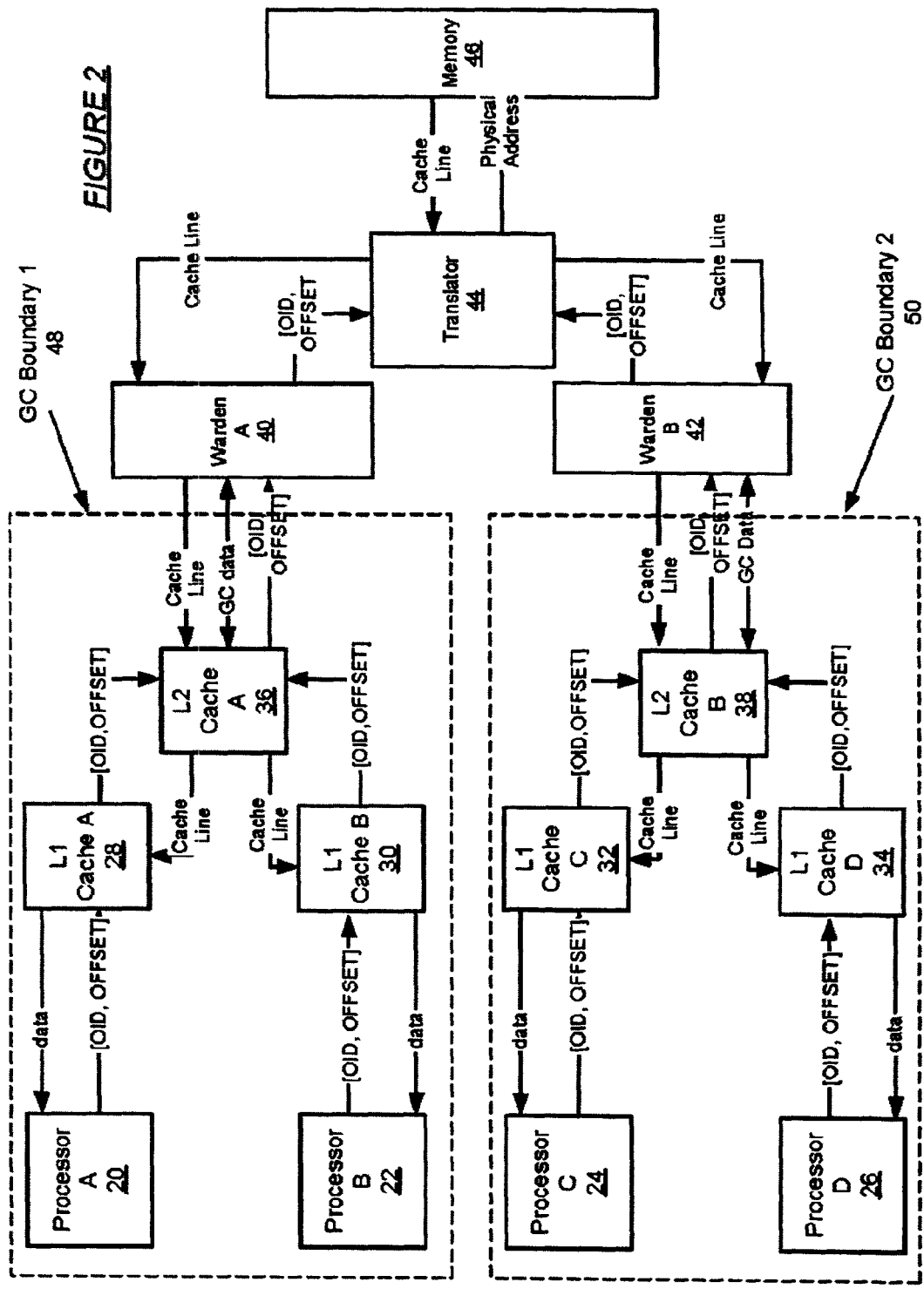
FIG. 2 illustrates an object-addressed memory hierarchy for a multiprocessor environment in accordance with one embodiment of the invention.

FIG. 2 illustrates an object addressed memory hierarchy for a multiprocessor environment in accordance with one embodiment of the invention. The object addressed memory hierarchy, with the exception of the warden, is disclosed in U.S. patent application Ser. No. 10/072,169, filed Feb. 7, 2002, entitled "Object-Addressed Memory Hierarchy," in the names of Gregory M. Wright, Mario I. Wolczko, and Matthew L. Seidl.

The object-addressed memory hierarchy, illustrated in FIG. 2, includes a plurality of processors (20, 22, 24, 26), each with an associated L1 cache (28, 30, 32, 34). For each pair of L1 caches (28 and 30, 32 and 34), there is an associated L2 cache (36, 38). Each L2 cache (36, 38) is associated with a warden (40, 42). Both wardens (40, 42) are associated with a translator (44), which is connected to memory (46).

The L1 Cache (28, 30, 32, 34) is a form of fast memory (holding recently accessed data), designed to speed up subsequent access to the same data. The L1 Cache (28, 30, 32 34), specifically, is located on or close to the microchip containing the processor (20, 22, 24, 26). The L2 Cache (36, 38) is similar to the L1 Cache (28, 30, 32 34) except that it contains data that was not as recently accessed as the data in the L1 Cache (28, 30, 32 34). Additionally, the L2 Cache (22) typically has a larger memory capacity and a slower access time. The memory (46) is typically random access memory (RAM).

The translator (44) intercepts cache misses, i.e., a load request that cannot be satisfied by the cache, and evictions of cache lines with encoded addresses from the cache, e.g., L1 Cache (28, 30, 32, 34), L2 Cache (36, 38), etc. The translator (44) uses an object table to obtain a physical address corresponding to an object address, i.e., a location-independent object identification (OID), and an offset. In one embodiment of the invention, the object table is built using objects. In another embodiment of the invention, the object table resides in virtual memory. For each object in memory there is a corresponding object table entry that contains the corresponding physical address. The translator (44) uses the OID as an index into the table to obtain a physical address for an object.

When a cache miss for an object occurs, the translator (44) intercepts the object address and extracts the OID. Using the OID, the translator (44) indexes into the object table (not shown) for the corresponding physical address. Once the physical address has been found, the translator (44) converts the load request for the object into a load request for a physical address in memory (46). The load request uses the physical address with a portion of the offset to locate a specific cache line or cache lines in memory (46). The translator (44) issues the load request and subsequently receives the cache line corresponding to the physical address. The translator (44) forwards the cache line to the L1 Cache (28, 30, 32, 34) via the L2 Cache (36, 38). The L1 Cache (30, 32) subsequently uses the low order bits of the offset to forward the requested word to the requesting processor (20, 22, 24, 26).

Those skilled in the art will appreciate that while only a load request was described with respect to the object-addressed memory hierarchy in FIG. 2, a store request may also be performed in the same manner.

In the event of a cache eviction, the translator (44) converts the object address into a physical address. The translator (44) subsequently takes the physical address and generates a store command that may be used by the memory (46) to store the evicted cache line.

The warden (40, 42) is logically located at a garbage collection (GC) boundary. In FIG. 2, a first garbage collection boundary (48) surrounds processors A and B (20, 22), L1 caches A and B (28, 30), and L2 cache A (36). Similarly, a second garbage collection boundary (50) surrounds processors C and D (24, 26), L1 caches C and D (32, 34), and L2 cache B (38). One skilled in the art can appreciate that FIG. 2 only illustrates one embodiment of the garbage collection boundary, and that the garbage collection boundary may be implemented to include any combination of processors and associated caches. The warden (40, 42) scans all cache lines that cross out of the respective GC boundary (48, 50) for any word with a set modified-reference bit. If a set modified-reference bit is found, the warden (40, 42) broadcasts a non-local command to set the non-local bit of the corresponding referenced object, which is stored with the object's header, i.e., the cache line containing the first word of the object. Further, for a cache line entering the GC boundary (48, 50), the warden (40, 42) clears all the modified-reference bits for that cache line and sets the non-local bit. Modified-reference bits and non-local bits are described below.

The steps that occur for a load operation in the object-addressed memory hierarchy illustrated in FIG. 2 are disclosed in U.S. patent application Ser. No. 10/072,169, filed Feb. 7, 2002, entitled "Object-Addressed Memory Hierarchy," in the names of Gregory M. Wright, Mario I. Wolczko, and Matthew L. Seidl. The only modification to the load operation occurs during a cache miss, i.e., a load request that cannot be satisfied by the cache. In this case, the warden (40, 42) intercepts the cache line prior to it entering the GC Boundary (48, 50). The warden (40, 42) clears all the set modified-reference bits within the cache line and sets the non-local bit for the cache line.

Further, the steps that occur for a cache eviction, i.e., a cache line, is written out of the cache, in the object-addressed memory hierarchy illustrated in FIG. 2 are disclosed in U.S. patent application Ser. No. 10/072,169, filed Feb. 7, 2002, entitled "Object-Addressed Memory Hierarchy," in the names of Gregory M. Wright, Mario I. Wolczko, and Matthew L. Seidl. In the invention, the inclusion of the warden into the object-addressed memory hierarchy results in an extra step in the process to modify the cache eviction routine. When a cache line is evicted from the cache, the warden (40, 42) intercepts the cache line at the GC Boundary (48, 50) and scans the evicted cache line for any word with a set modified-reference bit. For each set modified-reference bit, the warden (40, 42) broadcasts a non-local command to set the non-local bit of the corresponding referenced object.

Figure 3:
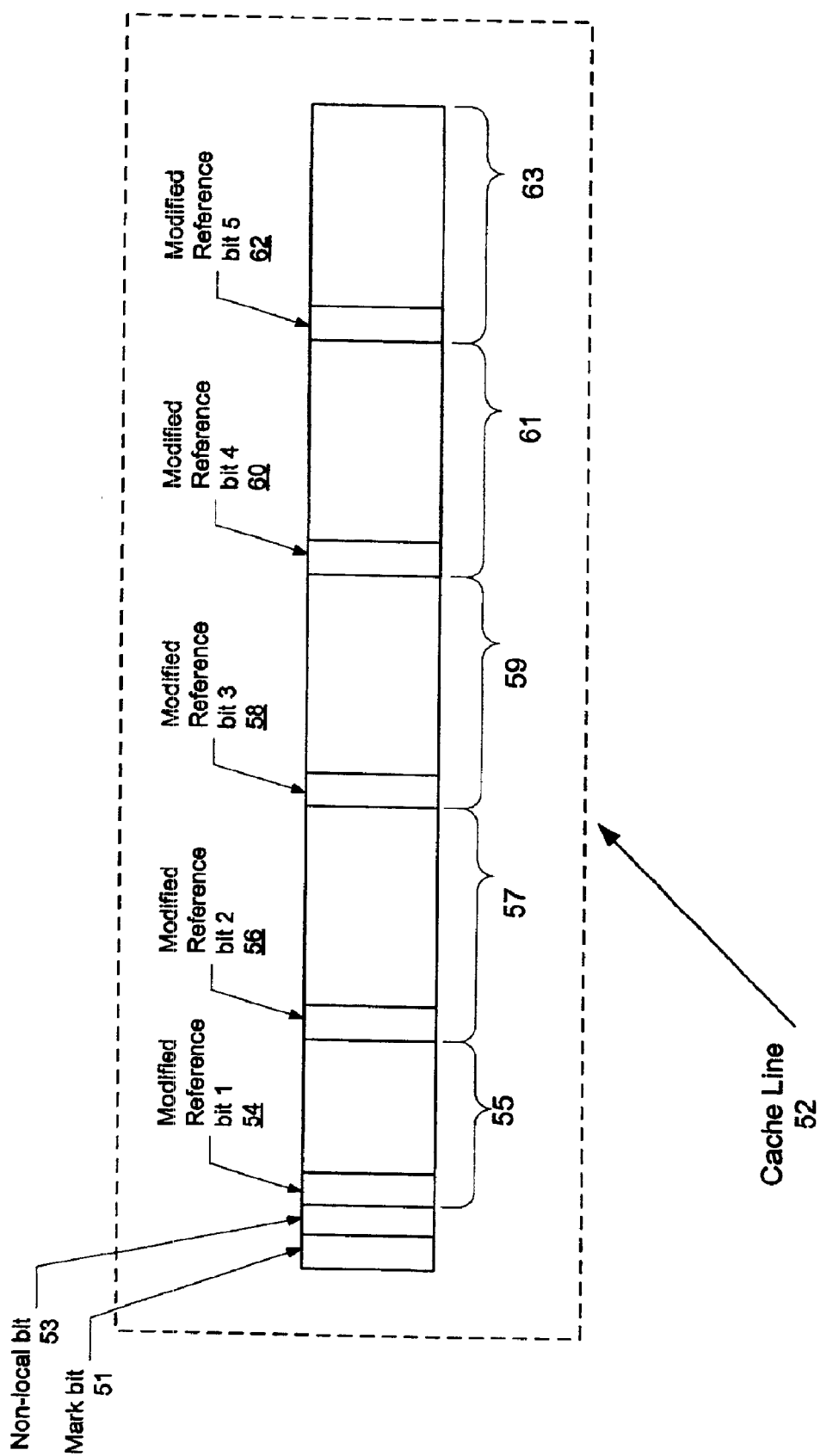
FIG. 3 illustrates a cache line in accordance with one embodiment of the invention.

FIG. 3 illustrates a cache line in accordance with one embodiment of the present invention. Each cache line (52), within a GC Boundary is tagged with a mark bit (51), a non-local bit (53), and each word (55, 57, 59, 61, 63) within the cache line (52) is tagged with a modified-reference bit (54, 56, 58, 60, 62). The mark bit (51) is used to indicate if the cache line (52) has been scanned during a garbage collection routine. The non-local bit (53) is used to indicate if the cache line (52) has ever crossed outside the GC boundary or if a reference to the object, located in the cache line (52), has crossed outside the GC boundary. The non-local bit (53) is set by the warden. The modified-reference bit (54, 56, 58, 60, and 62) is used to denote that the particular word, within the cache line (52), is a modified object reference. As described above, the modified-reference bit (54, 56, 58, 60, 62) is used by the warden when scanning evicted cache lines. The modified-reference bit (54, 56, 58, 60, 62) is set whenever a reference to an object is stored within a cache line. In one embodiment of the invention, a processor instruction set is extended to include a "store reference" command that is used whenever there is a request to store a reference to an object into any memory location. Whenever the memory location is in a cache, the modified-reference is set to indicate that a reference to the object is stored at the memory location. Further, when a cache line crosses into the GC boundary all the modified-reference bits are initially cleared (54, 56, 58, 60, 62). This functionality is handled by the warden. The non-local bit (53) and the modified-reference bits (54, 56, 58, 60, 62) convey information about the state of the cache line (52), and are transferred along with the data in the cache line. The state only exists within the GC Boundary, and does not exist outside the GC Boundary.

Figure 4:
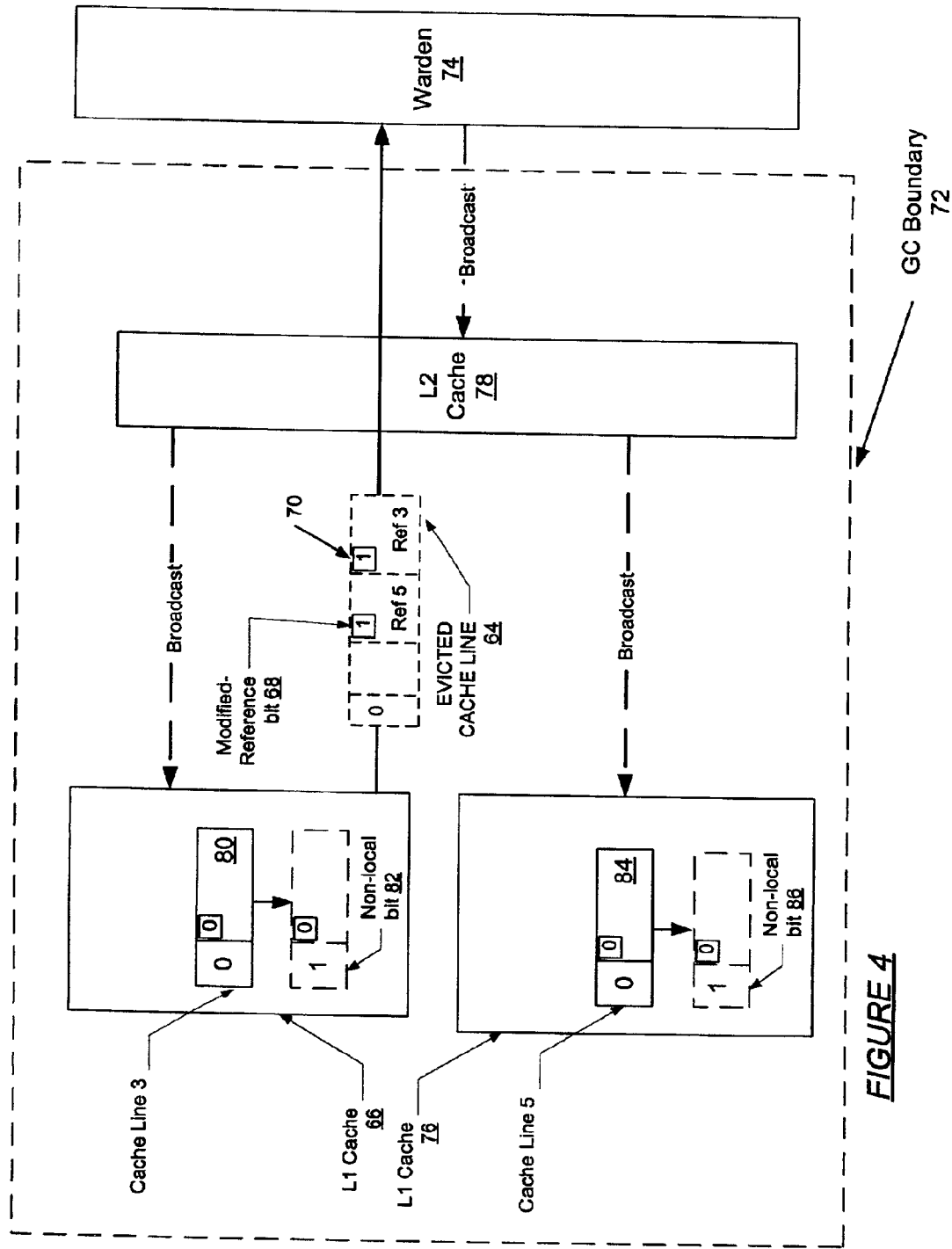
FIG. 4 illustrates a cache eviction in accordance with one embodiment of the invention.

FIG. 4 illustrates a cache eviction in accordance with one embodiment of the invention. In this example, a cache line (64) is being evicted from an L1 cache (66). The cache line (64) being evicted contains two references to objects (Ref 3, Ref 5). When the references to the objects (Ref 3, Ref 5) were initially stored into the cache line (64), the modified reference bit (68, 70) for each word containing a reference to an object, is set, as denoted by the "1." When the evicted cache line (64) crosses the GC boundary (72), the warden (74) intercepts the evicted cache line (64) and scans for set modified-reference bits (68, 70). In this case, the evicted cache line (64) contains two set modified-reference bits (68, 70). The warden (74), upon finding the set modified-reference bits (68, 70), broadcasts a non-local command to all the caches (66, 76, 78) within the GC boundary (72).

In this example, object 3 located in cache line 3 (80) is referenced by the evicted cache line (64), thus, when the cache (66) containing object 3 (80) receives the broadcast non-local command, the cache (66) sets the non-local bit (82) for the cache line (80) containing object 3, in this case the non-local bit for cache line 3 (80) is set. Similarly, object 5 located in cache line 5 (84) is referenced by the evicted cache line (64), thus, when the cache (76) containing object 5 (84) receives the broadcast non-local command, the cache (76) sets the non-local bit (86) for cache line containing object 5, in this case the non-local bit for cache line 5 (84) is set.

Figure 5:
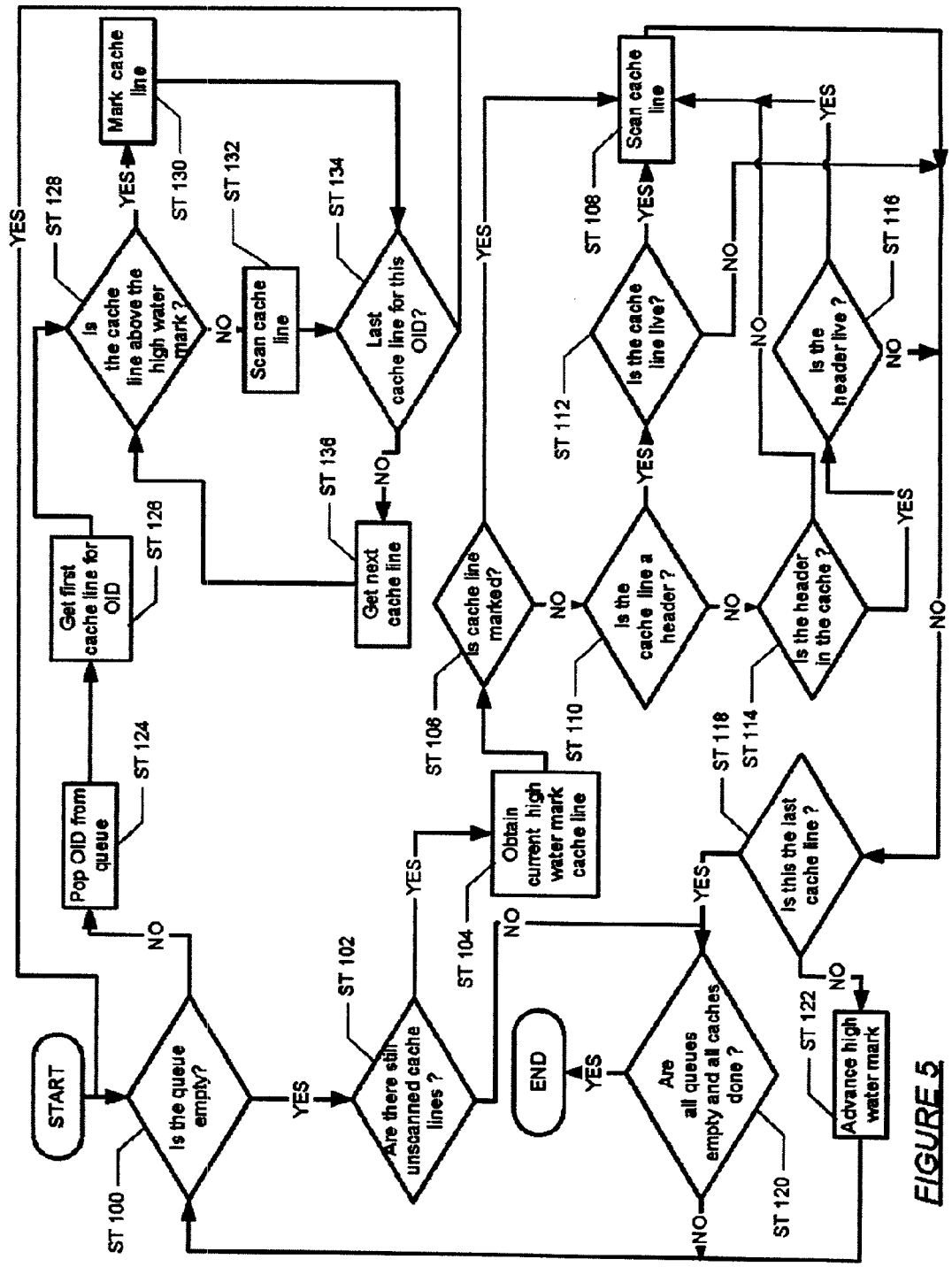
FIG. 5 illustrates a flowchart for garbage collection in accordance with one embodiment of the invention.

FIG. 5 illustrates a flow chart for garbage collection in accordance with one embodiment of the invention, and runs on every processor within the GC boundary. Prior to starting garbage collection, all processing within the GC boundary is suspended and a queue is then checked for OIDs (Step 100). The queue is a hardware-based queue which stores OIDs that have been broadcast by the garbage collector when a set modified-reference bit has been found during a scan of a cache line. In one or more embodiments of the invention, there is a queue associated with each cache. If the queue is empty then the garbage collector proceeds to determine if there ate any remaining unscanned cache lines (Step 102). If there are no remaining unscanned cached lines, then the garbage collector proceeds to Step 120 described below.

If there are remaining unscanned cache lines then the garbage collector obtains the current high water mark cache line (Step 104). The high water mark corresponds to the current position of the garbage collector in the cache. All know live cache lines below the high water mark have been scanned, and all live cache lines above the high water mark need to be scanned. The garbage collector then determines if the cache line is marked (Step 106). If the cache line is marked, then the cache line is subsequently scanned (Step 108). The steps involved in scanning the cache line are detailed in FIG. 6.

If the cache line is not marked (Step 106), then the garbage collector determines if the cache line is a header (Step 110). If the cache line is a header (Step 110), then the garbage collector proceeds to determine if the object on the cache line is live (Step 112). The steps involved in determining if an object on the given cache line is live are detailed in FIG. 7. If the cache line is live, then the garbage collector proceeds to scan the cache line (Step 108). If the cache line is not a header, then the garbage collector proceeds to determine if a header corresponding to the cache line is in the cache (Step 114). If the header corresponding to the cache line is not in the cache then the garbage collector proceeds to scan the cache line (Step 108). If the header corresponding to the cache line is in the cache (Step 114), then the garbage collector determines if the header corresponding to the cache line is live (Step 116). The steps involved in determining if a given header in a cache line is live are detailed in FIG. 7. If the header corresponding to the cache line is live (Step 116) then the garbage collector proceeds to scan the cache line (Step 108).

In the cases where the object on the cache line is not live (Step 112) or the header corresponding to the cache line is not live (Step 116), the garbage collector proceeds to determine if the cache line just scanned is the last cache line in the cache (Step 118). Similarly, in the case where the cache line is scanned (Step 108) (i.e., from Step 112, Step 114, and Step 116), once the garbage collector completes scanning the cache line the garbage collector proceeds to Step 118, as described above. If the most recently scanned cache line is the last cache line in the cache (Step 118) then the garbage collector determines if all queues are empty and all cache scans are complete within the garbage collection boundary (Step 120). If all queues are empty and all cache scans are complete within the garbage collection boundary then the garbage collector reclaims all objects within the GC boundary not marked as live.

If the most recently scanned cache line is not the last cache line in the cache, then the high water mark is advanced (Step 122) and the garbage collector then proceeds to Step 100. Similarly, if all queues are not empty or all cache scans are not complete within the garbage collection boundary (Step 120), then the garbage collector proceeds to Step 100.

If the queue is not empty (Step 100), then an OID is popped from the queue (Step 124). The OID is then used to obtain the first cache line corresponding to the OID (Step 126), i.e., the object header. It is then determined if the cache line, corresponding to the OID, is above the high water mark (Step 128). If the cache line, corresponding to the OID, is above the high water mark, then the cache line is marked (Step 130). If the cache line, corresponding to the OID, is not above the high water mark, then the cache line is scanned (Step 130). The steps involved in scanning the cache line are detailed in FIG. 6.

Once the cache line has been scanned (Step 132) or the cache line has been marked (Step 130), a determination is made whether the current cache line (i.e., the cache line corresponding to the OID) is the last cache line corresponding to the OID (Step 134). If the current cache line is not the last cache line corresponding to the OID, then a next cache line corresponding to the OID is retrieved (Step 136). Step 128 through Step 134 are subsequently repeated for the next cache line. If the current cache line is the last cache line corresponding to the OID (Step 143), then the process proceeds to Step 100.

Figure 6:
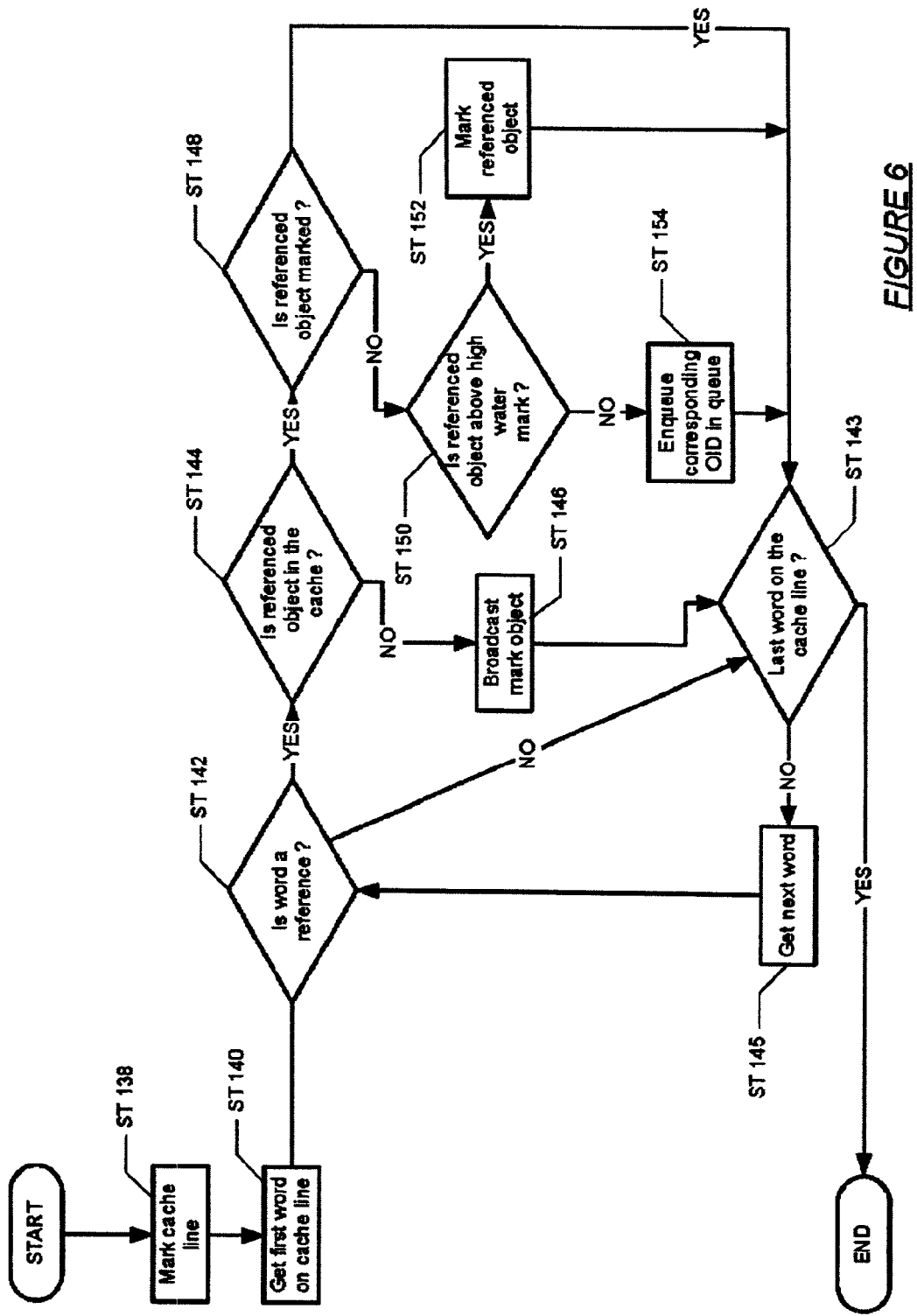
FIG. 6 illustrates a flowchart further detailing a portion of the FIG. 5 in accordance with one embodiment of the invention.

FIG. 6 illustrates a flowchart further detailing a portion of the FIG. 5 in accordance with one embodiment of the invention. The cache line is marked (Step 138) and the first word from the cache line is obtained (Step 140). If the word is not a reference to an object then the garbage collector proceeds to determine whether the word is the last word on the cache line (Step 143). If the word is not the last word on the cache line, then the garbage collector proceeds to retrieve the next word (Step 145). The process then proceeds to Step 142. If the word is the last word on the cache line (Step 143), then the process is complete.

If the word is a reference to an object (Step 142) then the garbage collector proceeds to determine whether the referenced object is in the cache (Step 144). If the referenced object is not in the cache, a mark object command is broadcast (Step 146). The process then proceeds to Step 143. If the referenced object is in the current cache, then the garbage collector proceeds to determine if the referenced object is marked (Step 148). If the referenced object is marked, then the process proceeds to Step 143. If the referenced object is not marked (Step 150), then the garbage collector determines if the referenced object is above the high water mark (Step 150). If the referenced object is above the high water mark, then the referenced object is marked (Step 152) and the process proceeds to Step 143. If the referenced object is not above the high water mark (Step 150), then the OID corresponding to the referenced object is enqueued (Step 154) and the process proceeds to Step 143.

Figure 7:
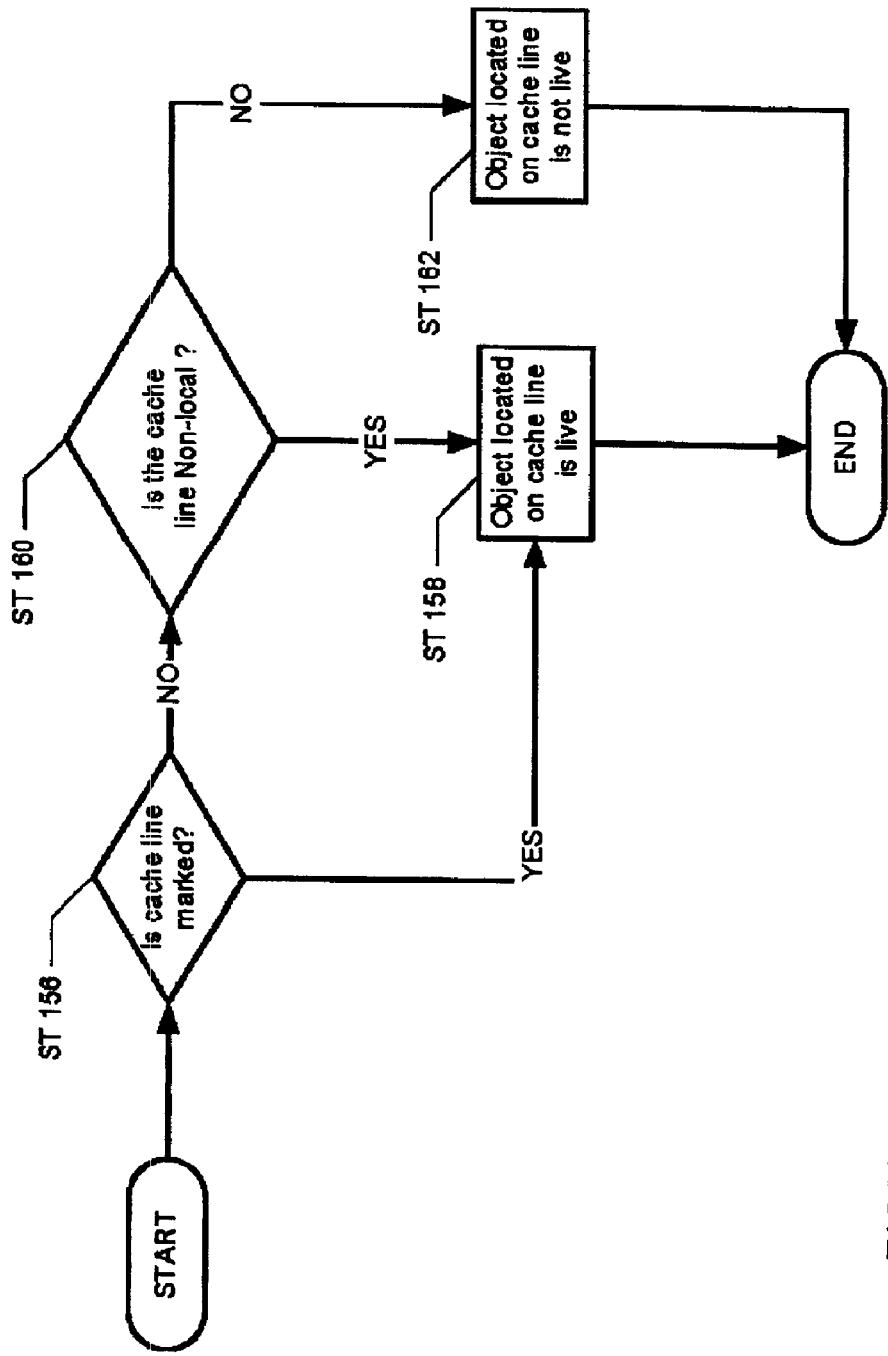
FIG. 7 illustrates a flowchart further detailing another portion of the FIG. 5 in accordance with one embodiment of the invention.

FIG. 7 illustrates a flowchart further detailing another portion of the FIG. 5 in accordance with one embodiment of the invention. If the cache line is marked (Step 156), then the object located on the cache line is live (Step 158). If the cache line is not marked (Step 156), then the garbage collector determines if the cache line is non-local (i.e., if the non-local bit is set) (Step 160). If the cache line is non-local (Step 160), then the object located on the cache line is live (Step 158). If the cache line is not non-local (Step 160), then the object located on the cache line is not live (Step 162).

In one embodiment of the invention, the scanning process described above may be performed concurrently on all caches within a given GC boundary. In one embodiment of the invention, processor instructions are provided to allow the invention to have increased functionality. For example, the processor instructions may include functionality to check the state of the non-local and marked bits, cause broadcasts within the GC boundary to set a cache line as non-local if the cache line is found, and to inspect the mark queue.

The invention may include one or more of the following advantages. The efficiency of garbage collection is increased through the use of hardware states (i.e., non-local bit, modified-reference bit, etc), and through the provision of hardware assistance (i.e., warden, etc). System overhead and cost are decreased by only using tagged memory within the GC boundary. A non-local bit, modified-reference bit, and a warden are used to track object references, which eliminate the need for software data structures to track references and to determine root objects. A warden is used to implement the write barrier decreasing the software overhead required. Those skilled in the art appreciate that the invention may include other advantages and benefits.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system providing hardware states for garbage collection comprising:

a plurality of processors;

an object cache operatively connected to at least one of the plurality of processors; and a tagged cache line comprising a non-local bit, a word, and a modified-reference bit associated with the word;

a warden operatively connected to the object cache, wherein the warden is located at an edge of a garbage collection boundary, wherein the warden broadcasts a non-local command to the object cache whenever the tagged cache line is evicted and crosses the garbage collection boundary and the modified-reference bit in the tagged cache line is set.

2. The computer system of claim 1, further comprising:

a memory; and a translator interposed between the warden and the memory, wherein the translator maps an object address to a physical address within the memory.

3. The computer system of claim 1, wherein the plurality of processors uses an extended instruction set.

4. The computer system of claim 3, the extended instruction set comprising a modified load procedure.

5. The computer system of claim 3, the extended instruction set comprising a modified store procedure.

6. The computer system of claim 5, wherein the modified store procedure sets the modified-reference bit of word whenever an object reference is stored in the word.

7. The computer system of claim 1, wherein the non-local command to the object cache sets a non-local bit of a referenced object when the tagged cache line that crossed the garbage collection boundary comprises reference to the referenced object.

8. The computer system of claim 1, the garbage collection boundary comprising at least of one of the plurality of processors and the object cache.

9. The computer system of claim 1, wherein the warden sets the non-local bit of the tagged cache line when the tagged cache line enters the garbage collection boundary.

10. The computer system of claim 1, wherein the warden clears the modified-reference bit in the tagged cache line when the tagged cache line enters the garbage collection boundary.

11. The computer system of claim 1, wherein the object cache is associated with a hardware queue.

12. The computer system of claim 11, wherein the hardware queue is used by the warden during broadcasts of the non-local command to the object cache.

13. The computer system of claim 1, wherein one of the plurality of processors broadcasts a mark object command during a garbage collection routine.

14. A computer system providing hardware states for garbage collection comprising:

a plurality of processors;

a tagged cache line comprising a non-local bit, a word, and a modified-reference bit associated with the word;

an object cache operatively connected to at least one of the plurality of processors; and a warden operatively connected to the object cache, wherein the warden is located at an edge of a garbage collection boundary, wherein the warden broadcasts a non-local command to the object cache whenever the tagged cache line is evicted and crosses the garbage collection boundary and the modified-reference bit in the tagged cache line is set;

a memory; and a translator interposed between the warden and the memory, wherein the translator maps an object address to a physical address within the memory.

15. A method for local garbage collection in a multiprocessor environment comprising:

halting all processors within a garbage collection boundary;

scanning a tagged cache line in an object cache for a first object when the tagged cache line is live;

marking the first object as live if the first object is referenced by root;

scanning the first object for a reference to a second object if the first object is live;

broadcasting a mark object command if the reference to the second object is found;

marking the tagged cache line as done; and reclaiming the first object if the first object is not live, wherein the tagged cache line comprises a mark bit, a non-local bit, a word, and a modified-reference bit associated with the word, and wherein the tagged cache line is live if at least one selected from the group consisting of the mark bit and the non-local bit is set.

16. The method of claim 15, wherein broadcasting the mark object command places an object identification number referencing the second object into a queue.

17. The method of claim 16, comprising:

checking the queue for the object identification number;

releasing the object identification number from the queue if the object identification number is present in the queue;

marking the second object referenced by the object identification number as live if the object identification number is present in the queue;

scanning the second object referenced by the object identification number for a reference to a third object; and broadcasting the mark object command if the reference to the third object is found.

18. The method of claim 15, the garbage collection boundary comprising a processor and an object cache.

19. The method of claim 15, the garbage collection boundary comprising a plurality of processors and a plurality of object caches.

20. The method of claim 15, wherein a warden is located at an edge of the garbage collection boundary.

21. The method of claim 15, wherein determining if the first object is a root object uses the non-local bit.

22. The method of claim 15, wherein scanning the first object for the reference to the second object uses the modified reference bit.

23. The method of claim 15, further comprising:

performing a non-cached load of the object if the entirety of the first object is not in the garbage collection boundary; and determining if the first object is live.

24. An apparatus for performing local garbage collection in a multiprocessor environment comprising:

means for halting all processors within a garbage collection boundary;

means for scanning a tagged cache line in an object cache for a first object when the tagged cache line is live;

means for marking the first object as live if the first object is referenced by a root;

means for scanning the first object for a reference to a second object if the first object is live;

means for broadcasting a mark object command if the reference to the second object is found;

means for marking the tagged cache line as done; and means for reclaiming the first object if the first object is not live, wherein the tagged cache line comprises a mark bit, a non-local bit, a word, and a modified-reference bit associated with the word, and wherein the tagged cache line is live if at least one selected from the group consisting of the mark bit and the non-local bit is set.

25. The apparatus of claim 24, further comprising:

means for checking the queue for the object identification number;

means for releasing the object identification number from the queue if the object identification number is present in the queue;

means for marking the second object referenced by the object identification number as live if the object identification number is present in the queue;

means for scanning the second object referenced by the object identification number for a reference to a third object; and means for broadcasting the mark object command if the reference to the third object is found.

* * * * *